United States Patent
Suzuki

(10) Patent No.: US 8,240,227 B2
(45) Date of Patent: *Aug. 14, 2012

(54) INJECTION-MOLDED RESIN FACE GEAR

(75) Inventor: Yasuhiro Suzuki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 393 days.

This patent is subject to a terminal disclaimer.

(21) Appl. No.: 12/462,150

(22) Filed: Jul. 30, 2009

(65) Prior Publication Data

US 2010/0031765 A1    Feb. 11, 2010

(30) Foreign Application Priority Data

Aug. 6, 2008   (JP) .................................. 2008-202492
May 11, 2009   (JP) .................................. 2009-114399

(51) Int. Cl.
    *F16H 1/12*   (2006.01)
(52) U.S. Cl. ...................................... 74/416; 74/DIG. 10
(58) Field of Classification Search .................... 74/416, 74/431, 434, 443, 457, 459.5, 460, DIG. 10
    See application file for complete search history.

(56) References Cited

U.S. PATENT DOCUMENTS

| | | | | |
|---|---|---|---|---|
| 6,070,484 A * | 6/2000 | Sakamaki | ........................ | 74/434 |
| 8,006,582 B2 * | 8/2011 | Miura | ............................... | 74/434 |
| 8,011,263 B2 * | 9/2011 | Suzuki | ............................. | 74/416 |
| 8,028,598 B2 * | 10/2011 | Hagihara | ........................ | 74/431 |
| 8,100,026 B2 * | 1/2012 | Suzuki et al. | .................... | 74/434 |
| 2002/0017153 A1 * | 2/2002 | Sakamaki | ........................ | 74/434 |
| 2006/0081082 A1 * | 4/2006 | Noguchi et al. | ................. | 74/457 |
| 2007/0283776 A1 * | 12/2007 | Fujimaru | ........................ | 74/434 |

FOREIGN PATENT DOCUMENTS

| | | | |
|---|---|---|---|
| EP | 1959167 A2 * | 8/2008 | |
| JP | 2002-223673 | 8/2002 | |
| JP | 2004019774 A * | 1/2004 | |
| JP | 2008232432 A * | 10/2008 | |

* cited by examiner

*Primary Examiner* — Justin Krause
*Assistant Examiner* — Adam D Rogers
(74) *Attorney, Agent, or Firm* — DLA Piper LLP (US)

(57) ABSTRACT

An injection-molded resin face gear is provided that can suppress deterioration of gear accuracy caused by shrinkage of resin material after injection-molding, and allow accurate and smooth rotation transmission.

An injection-molded resin face gear 1 includes a boss 3, a disk-shaped web 4, and a teeth section 5. The boss 3 has an axis hole 2. The web 4 is formed on an outer circumferential side of the boss 3 in an outward radial direction. The teeth section 5 is formed on an outer circumferential edge of the web 4. The teeth section 5 includes a cylindrical section 13, a disk-shaped section 14, and a plurality of teeth 15. The cylindrical section 13 is connected to the outer circumferential edge of the web 4. The disk-shaped section 14 is formed on one end side of the cylindrical section 13 in the outward radial direction. The teeth 15 are formed evenly spaced on an outer circumferential side of the cylindrical section 13 such that one side surface of the disk-shaped section 14 is a bottom land 16. The web 4 and the disk-shaped section 14 have the same thicknesses. The thickness of the cylindrical section 13 is thinner than the thickness of the disk-shaped section 14.

4 Claims, 10 Drawing Sheets

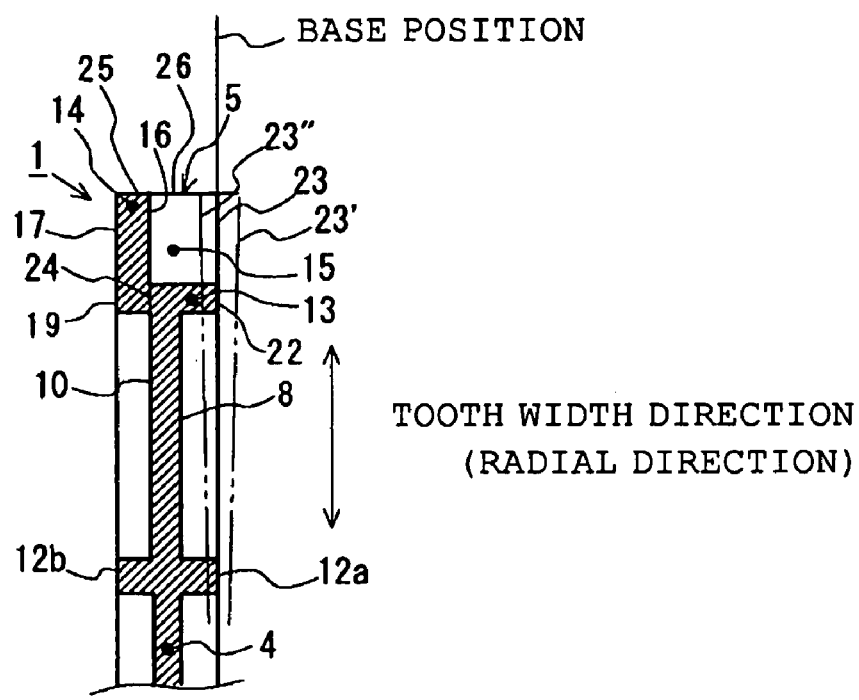
FIG. 5
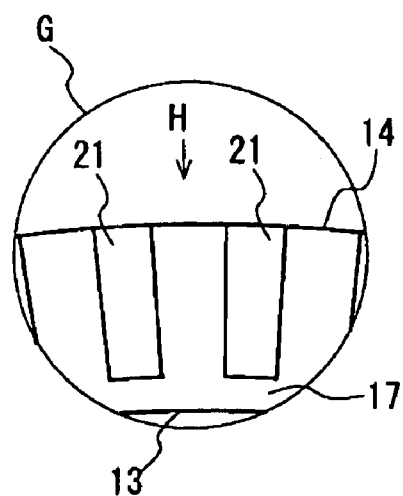 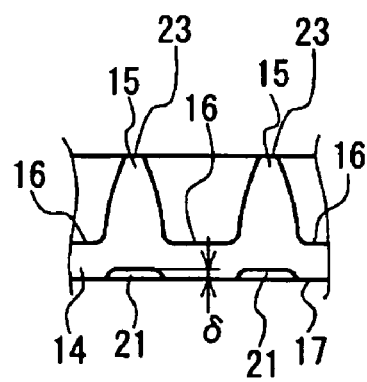
FIG. 6          FIG. 7

LEFT ←→ RIGHT

INJECTION-MOLDED RESIN FACE GEAR

BACKGROUND OF THE INVENTION

1. Field of the Invention

The present invention relates to an injection-molded resin face gear used to allow power transmission and rotation transmission between two perpendicular axes.

2. Description of the Related Art

In recent years, in technical fields related to power transmission devices using gears, resin gears are being used in place of metal gears to achieve quieter operation noise, reduced weight, and lower costs.

Based on such technical background of recent years, there is discussion regarding forming a face gear 100, such as that shown in FIG. 13 and FIG. 14, using resin. In the face gear 100 shown in the drawings, a roughly disk-shaped web 102 is formed on an outer circumferential side of an axis section 101. A teeth section 103 is formed on an outer circumferential edge of the web 102. The teeth section 103 of the face gear 100 is formed such as to have teeth 104 projecting towards one side surface 105 side. A plurality of teeth 104 are formed evenly spaced in a circumferential direction (refer to Patent Literature 1).

Patent Literature 1: Japanese Patent Laid-open Publication No. 2002-223673 (refer, in particular, to paragraphs 0004 to 0005, and FIG. 3 and FIG. 5)

However, when the metal face gear 100 such as that shown in FIG. 13 and FIG. 14 is simply formed using resin (injection-molded), as a result of shrinkage (formation shrinkage) of resin material after injection-molding, the outer circumferential edge side of the web 102 collapses (curves and becomes deformed) such that a tooth crest 106 moves in a right-hand side direction in FIG. 14. The teeth 104 collapse (the tooth crest 106 is displaced to a position indicated by 106'). Gear accuracy may deteriorate, thereby making accurate and smooth rotation transmission difficult.

SUMMARY OF THE INVENTION

Therefore, an object of the present invention is to provide an injection-molded resin face gear that can suppress deterioration of gear accuracy caused by shrinkage of resin material after injection-molding, and allow accurate and smooth rotation transmission.

A first aspect of the invention is related to an injection-molded resin face gear including a boss, a disk-shaped web, and a teeth section. The web is formed on an outer circumferential side of the boss in an outward radial direction. The teeth section is formed on an outer circumferential edge of the web. In the invention, the teeth section includes a cylindrical section, a disk-shaped section, and a plurality of teeth. The cylindrical section is connected to the outer circumferential edge of the web. The disk-shaped section is formed on one end side of the cylindrical section in the outward radial direction. The teeth are formed evenly spaced on an outer circumferential side of the cylindrical section, such that one side surface of the disk-shaped section is a bottom land. The disk-shaped section and the web have the same thicknesses. The thickness of the cylindrical section is thinner than the thickness of the disk-shaped section. An overall connection section between the web and the cylindrical section is positioned between an end surface on the one end side of the cylindrical section and an end surface on another end side that is an opposite side to the one end side. The overall connection section is also positioned such as to be misaligned with another side surface of the disk-shaped section and an end surface on the other end side of the cylindrical section, along a direction in which a rotational center axis extends.

A second aspect of the invention is related to an injection-molded resin face gear including a boss, a disk-shaped web, and a teeth section. The web is formed on an outer circumferential side of the boss in an outward radial direction. The teeth section is formed on an outer circumferential edge of the web. In the invention, the teeth section includes a cylindrical section, a disk-shaped section, and a plurality of teeth. The cylindrical section is connected to the outer circumferential edge of the web. The disk-shaped section is formed on one end side of the cylindrical section in the outward radial direction. The teeth are formed evenly spaced on an outer circumferential side of the cylindrical section, such that one side surface of the disk-shaped section is a bottom land. The disk-shaped section and the cylindrical section have the same thicknesses. The thickness of the web is thinner than the thickness of the disk-shaped section. An overall connection section between the web and the cylindrical section is positioned between an end surface on the one end side of the cylindrical section and an end surface on another end side that is an opposite side to the one end side. The overall connection section is also positioned such as to be misaligned with another side surface of the disk-shaped section and an end surface on the other end side of the cylindrical section, along a direction in which a rotational center axis extends.

A third aspect of the invention is related to an injection-molded resin face gear including a boss, a disk-shaped web, and a teeth section. The web is formed on an outer circumferential side of the boss in an outward radial direction. The teeth section is formed on an outer circumferential edge of the web. In the invention, the teeth section includes a cylindrical section, a disk-shaped section, and a plurality of teeth. The cylindrical section is connected to the outer circumferential edge of the web. The disk-shaped section is formed on one end side of the cylindrical section in the outward radial direction. The teeth are formed evenly spaced on an outer circumferential side of the cylindrical section, such that one side surface of the disk-shaped section is a bottom land. The disk-shaped section and the cylindrical section have the same thicknesses. The thickness of the web is thicker than the thickness of the disk-shaped section. An overall connection section between the web and the cylindrical section is positioned between an end surface on the one end side of the cylindrical section and an end surface on another end side that is an opposite side to the one end side. The overall connection section is also positioned such as to be misaligned with another side surface of the disk-shaped section and an end surface on the other end side of the cylindrical section, along a direction in which a rotational center axis extends.

A fourth aspect of the invention is related to an injection-molded resin face gear including a boss, a disk-shaped web, and a teeth section. The web is formed on an outer circumferential side of the boss in an outward radial direction. The teeth section is formed on an outer circumferential edge of the web. In the invention, the teeth section includes a cylindrical section, a disk-shaped section, and a plurality of teeth. The cylindrical section is connected to the outer circumferential edge of the web. The disk-shaped section is formed on one end side of the cylindrical section in the outward radial direction. The teeth are formed evenly spaced on an outer circumferential side of the cylindrical section, such that one side surface of the disk-shaped section is a bottom land. The web and the cylindrical section have the same thicknesses. The thickness of the disk-shaped section is thicker than the thickness of the web. An overall connection section between the web and the cylindrical section is positioned between an end surface on the one end side of the cylindrical section and an end surface on another end side that is an opposite side to the one end side. The overall connection section is also positioned such as to be misaligned with another side surface of the disk-shaped section and an end surface on the other end side of the cylindrical section, along a direction in which a rotational center axis extends.

The injection-molded resin face gear according to a fifth aspect of the invention is the injection-molded resin face gear according to any one of the first to fifth aspects, in which the other side surface of the disk-shaped section and the end surface on the one end side of the cylindrical section are positioned on a same plane. An outer peripheral surface of the disk-shaped section and an outer peripheral surface of the teeth are positioned on a same peripheral surface. Tooth crests of the teeth and the end surface on the other end side of the cylindrical section are positioned on a same plane.

EFFECT OF THE INVENTION

In the invention, teeth collapse caused by shrinkage of resin material after injection-molding can be suppressed, and deterioration of gear accuracy can be suppressed. As a result, accurate and smooth rotation transmission can be achieved.

BRIEF DESCRIPTION OF THE DRAWINGS

FIG. 5 is an enlarged view of portion F in FIG. 4;

FIG. 6 is an enlarged view of portion G in FIG. 3;

FIG. 7 is a partially enlarged view of an outer circumferential edge of the injection-molded resin face gear according to the embodiment of the present invention, viewed from direction H in FIG. 6;

DETAILED DESCRIPTION OF THE PREFERRED EMBODIMENT

Embodiments of the present invention will be described in detail, with reference to the drawings.

Figure 1A:
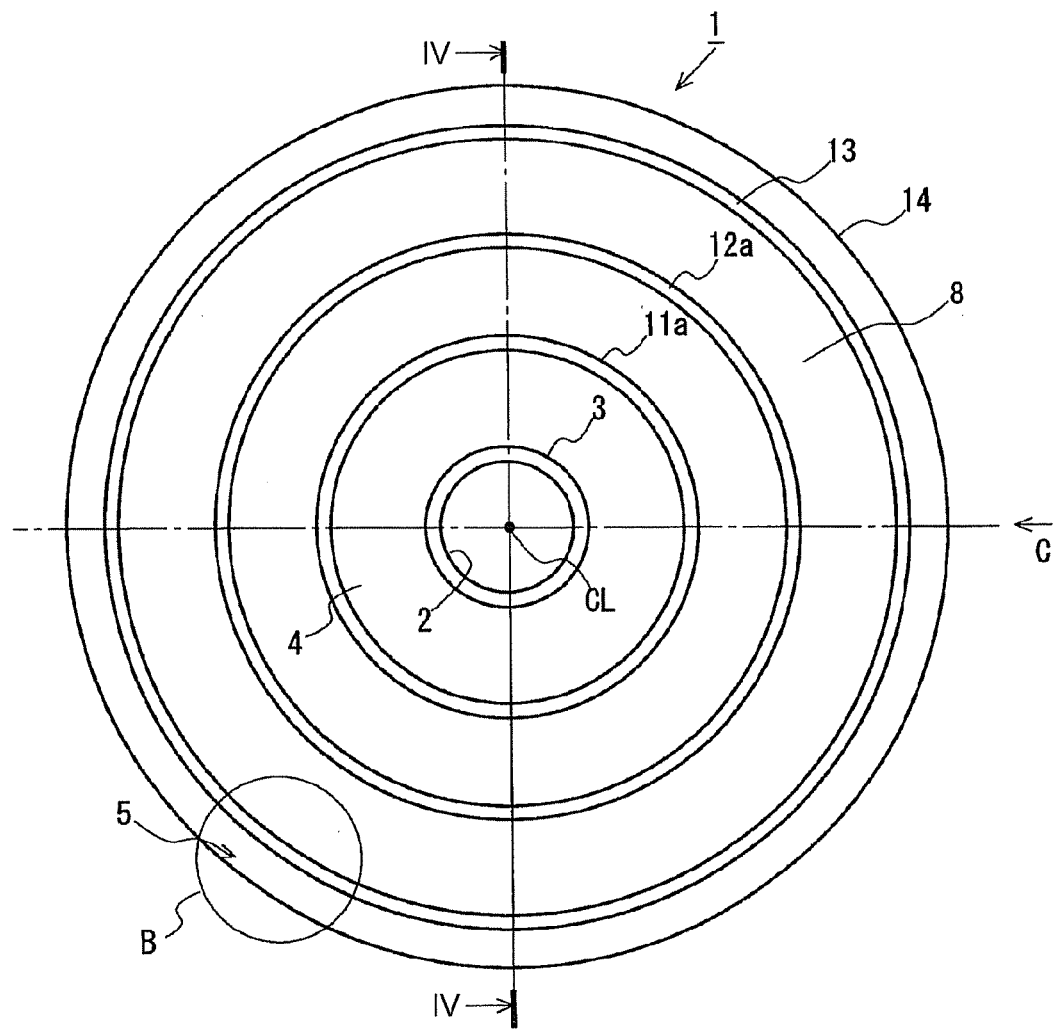
FIG. 1A is a front view of an injection-molded resin face gear according to an embodiment of the present invention (an injection-molded resin face gear in FIG. 2 viewed from direction A)
Figure 1B:
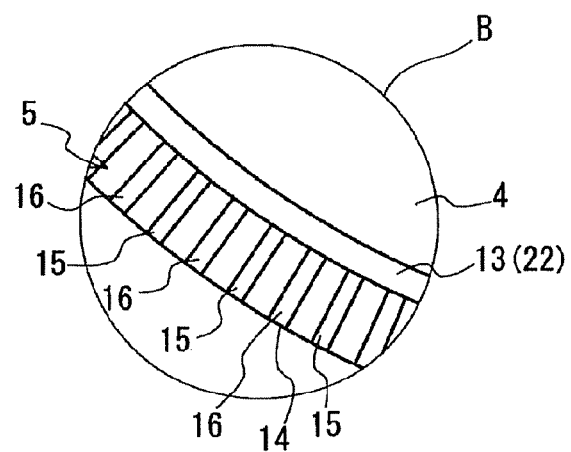
FIG. 1B is an enlarged view of portion B in FIG. 1A.
Figure 2:
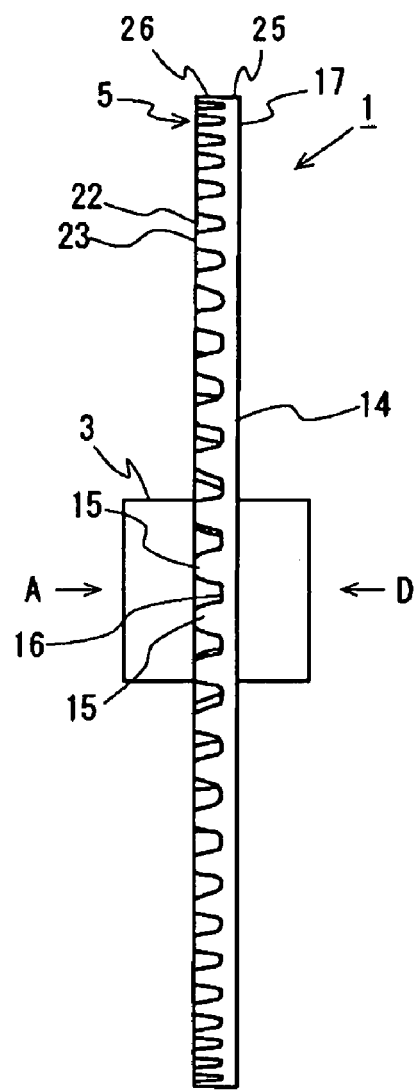
FIG. 2 is a side view of the injection-molded resin face gear according to the embodiment of the present invention (viewed from direction C in FIG. 1A)
Figure 3:
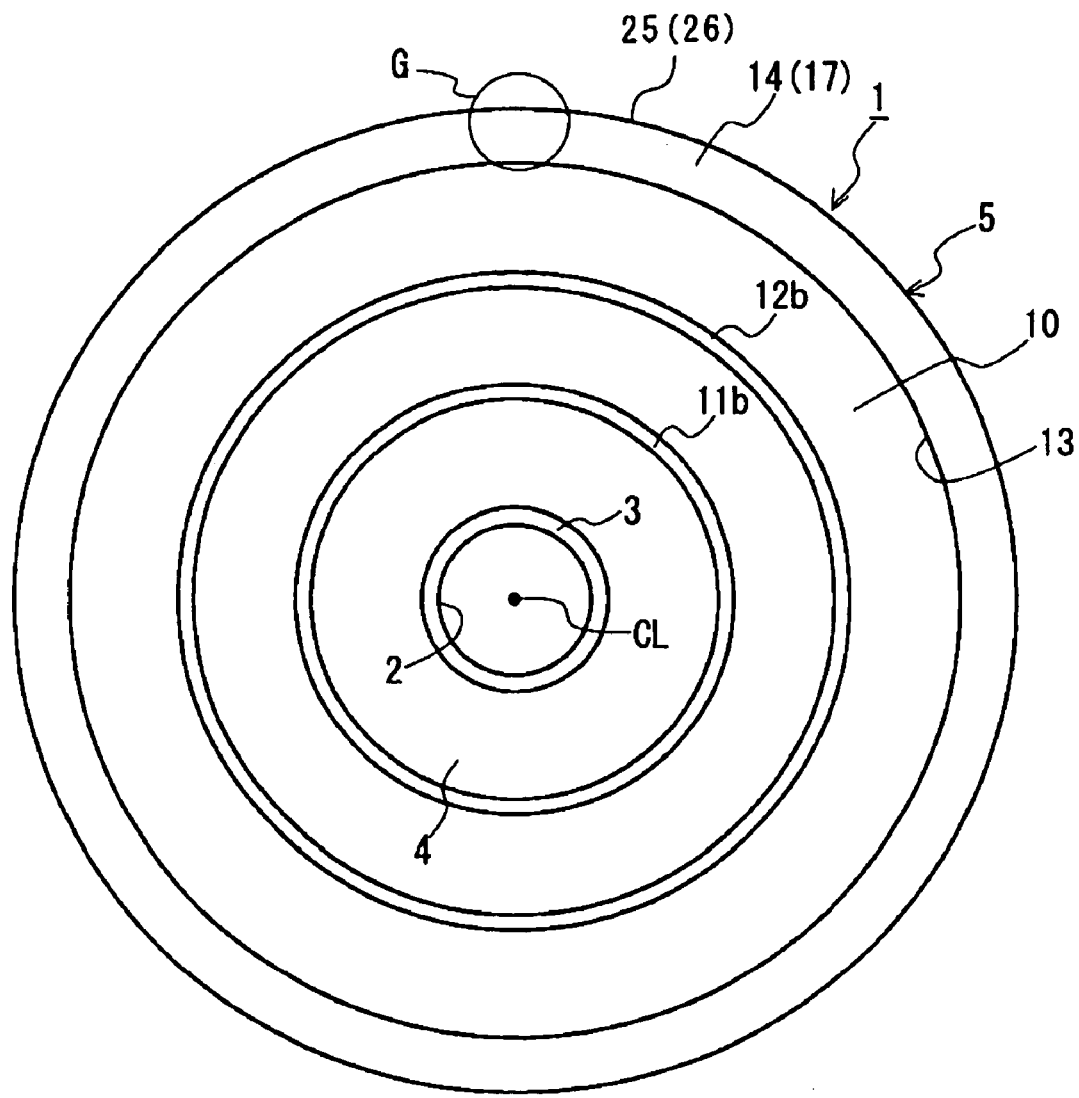
FIG. 3 is a rear view of the injection-molded resin face gear according to the embodiment of the present invention (the injection-molded resin face gear in FIG. 2 viewed from direction D)
Figure 4:
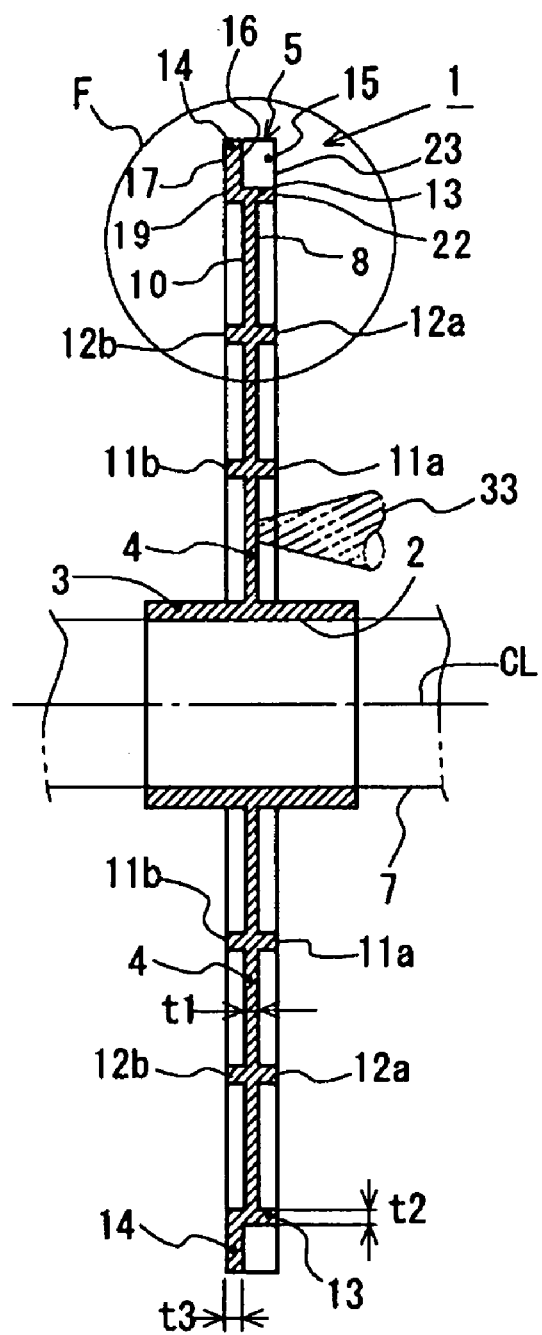
FIG. 4 is a cross-sectional view of the injection-molded resin face gear according to the embodiment of the present invention, in which the injection-molded resin face gear in FIG. 1 is taken along line E-E.

FIG. 1 to FIG. 5 are diagrams of an injection-molded resin face gear 1 according to an embodiment of the present invention. FIG. 1A is a front view of the injection-molded resin face gear 1 (an injection-molded resin face gear 1 in FIG. 2 viewed from direction A). FIG. 1B is an enlarged view of portion B in FIG. 1A. FIG. 2 is a side view of the injection-molded resin face gear (viewed from direction C in FIG. 1A). FIG. 3 is a rear view of the injection-molded resin face gear 1 (the injection-molded resin face gear in FIG. 2 viewed from direction D). FIG. 4 is a cross-sectional view taken along line E-E in FIG. 1. FIG. 5 is an enlarged view of portion F in FIG. 4.

As shown in the diagrams, the injection-molded resin face gear 1 according to the embodiment includes a cylindrical boss 3, a disk-shaped web 4, and a teeth section 5. The boss 3 has an axis hole 2. The web 4 is formed on an outer circumferential side of the boss 3 in an outward radial direction. The teeth section 5 is formed on an outer circumferential edge of the web 4. The injection-molded resin face gear 1 according to the embodiment is formed by injection-molding, using resin material such as polyacetal, polyamide, polyphenylene sulfide, or polybutylene terephthalate.

In the injection-molded resin face gear 1 described above, a rotation locking means, such as a key groove or a spline groove (not shown), is formed on an inner circumferential surface of the axis hole 2 in the boss 3. The rotation locking mechanism is engaged with a rotation axis 7 fitted into the axis hole 2, such as to integrally rotate with the rotation axis 7.

The disk-shaped web 4 is formed on an outer peripheral surface of the boss 3, in a center section in a direction along a rotational center axis CL. The web 4 extends in the outward radial direction. An inner circumferential edge of the web 4 is connected to the outer peripheral surface of the boss 3. An outer circumferential edge of the web 4 is connected to the teeth section 5. First circumferential direction ribs 11a and second circumferential direction ribs 12a are formed on a first side surface 8 of the web 4. The first circumferential direction ribs 11a are formed near the boss 3 and are concentric with the boss 3. The second circumferential direction ribs 12a are positioned between the first circumferential direction ribs 11a and the teeth section 5, and are concentric with the first circumferential direction ribs 11a. The first circumferential direction ribs 11a and the second circumferential direction ribs 12a on the first side surface 8 are formed such as to project from the first side surface 8 in the shape of a ring. First circumferential direction ribs 11b and second circumferential direction ribs 12b are formed on a second side surface 10 of the web 4. The first circumferential direction ribs 11b are positioned in a location symmetrical in the radial direction with the first circumferential direction ribs 11a on the first side surface 8. The second circumferential direction ribs 12b are positioned in a location symmetrical in the radial direction with the second circumferential direction ribs 12a on the first side surface 8. The first circumferential direction ribs 11b and the second circumferential direction ribs 12b on the second side surface 10 are formed such as to project from the second side surface 10 of the web 4 in the shape of a ring. Thicknesses of the first circumferential direction ribs 11a, the first circumferential direction ribs 11b, the second circumferential direction ribs 12a, and the second circumferential direction ribs 12b are almost the same as the thickness of the web 4 (when the thickness of the web 4 is t1, taking into consideration formation tolerance and the like, (t1)±0.3·(t1)). The first circumferential direction ribs 11a and the second circumferential direction ribs 12a are formed on the first side surface 8 of the web 4, and the first circumferential direction ribs 11b and the second circumferential direction ribs 12b are formed on the second side surface 10 in this way. As a result, surface rigidity of the web 4 can be enhanced.

The teeth section 5 includes a ring-shaped, cylindrical section 13, a shoulder-shaped, disk-shaped section 14, and a plurality of teeth 15. The cylindrical section 13 is connected to the outer circumferential edge of the web 4. The disk-shaped section 14 is formed on one end side of the cylindrical section 13 (left-hand side in FIG. 4 and FIG. 5) in the outward radial direction. The teeth 15 are formed straddling the cylindrical section 13 and the disk-shaped section 14. A cross-sectional shape of the teeth section 5 in FIG. 4 and FIG. 5 is a rough L-shape, formed by the cylindrical section 13 and the disk-shaped section 14.

The teeth 15 are formed on one side surface (right-hand side surface in FIG. 4 and FIG. 5) of the disk-shaped section 14 in the teeth section 5, evenly spaced along the circumferential direction. One side surface of the disk-shaped section 14 between each tooth 15 forms a bottom land 16.

The plurality of teeth 15 are formed evenly spaced on the one side surface (right-hand side surface in FIG. 4 and FIG. 5) of the disk-shaped section 14 in the teeth section 5. An amount of shrinkage (formation shrinkage) in a direction along the rotational center axis CL after injection-molding differs between a section in which the teeth 15 are formed and a section corresponding with the bottom lands 16. In other words, on a back surface 17 side of the disk-shaped section 14 in the teeth section 5, the section corresponding with the teeth 15 shrinks more than the section corresponding to the bottom lands 16 in the rotational center axis CL direction. The section corresponding to the teeth 15 is drawn slightly inward ($\delta$ is about ($\frac{1}{100}$) to ($\frac{2}{100}$)·mm). The section that is drawn inward serves as a recess 21 that extends along a tooth width direction (radial direction) (refer to FIG. 6 and FIG. 7).

As shown in detail in FIG. 5, one end side of the teeth 15 in the tooth width direction (inward radial direction end side) is integrally formed on the outer peripheral surface of the cylindrical section 13 of the teeth section 5. An end surface 22 of another end side of the cylindrical section 13 (the right end side in FIG. 4 and FIG. 5) and tooth crests 23 of the teeth 15 are flush (on a same plane with no level difference, and positioned on a plane perpendicular to the rotational center axis CL). Another end side of the teeth 15 in the tooth width direction (an outer peripheral surface 26 on the outward radial direction end side) matches an outer peripheral surface 25 of the disk-shaped section 14 (positioned on a same peripheral surface of which the rotational center axis CL is the center). A space between each tooth 15 is blocked by the cylindrical section 13 on an inward radial direction end side of the teeth section 5. The space between each tooth 15 is open in the outward radial direction on an outward radial direction end side of the teeth section 5. The back surface 17 (excluding the recess 21) of the disk-shaped section 14 is formed flush with an end surface 19 on one end side of the cylindrical section 13 (on a same plane with no level difference, and positioned on a plane perpendicular to the rotational center axis CL).

As shown in FIG. 5, the inner circumferential surface of the cylindrical section 13 in the teeth section 5 is connected to the outer peripheral surface of the web 4 such that a line 24 and the second side surface 10 of the web 4 almost match (positioned on a same plane). The line 24 is the bottom land 16 serving as one side surface of the disk-shaped section 14, extended in the inward radial direction. As a result of this configuration, the shrinkage (formation shrinkage) amount of resin in the inward radial direction in the injection-molded resin face gear 1 after injection-molding is almost equal between a left-hand side section in FIG. 5 and a right-hand side section in FIG. 5, with the web 4 as a boundary. As a result, the collapse of the teeth 15, as shown in FIG. 5, does not occur in the injection-molded resin face gear 1. In other words, the tooth crests 23 do not move to a position 23' that is further to the right-hand side in FIG. 5 than a base position, nor does the tooth crests 23 move to a position 23" that is further to the left-hand side in FIG. 5 than the base position. Therefore, a gear can be constructed to have high accuracy. A meshing position of the injection-molded resin face gear 1 according to the embodiment, at which the injection-molded resin face gear 1 meshes with a mating gear, is highly accurate. Therefore, a highly accurate rotation transmission can be achieved.

A connection position between the outer circumferential edge of the web 4 and the cylindrical section 13 is as follows. When the thickness of the web 4 is t1, a length from the second side surface 10 of the web 4 to the end surface 19 on one end side of the cylindrical section 13, along a direction in which the rotational center axis CL extends, is almost t1. A length from the first side surface 8 of the web 4 to the end surface 22 on the other end of the cylindrical section 13, along the direction in which the rotational center axis CL extends, is almost t1. However, the embodiment is not limited thereto. In other words, the connection position between the outer circumferential edge of the web 4 and the cylindrical section 13 can be shifted closer to the tooth crest 23 than that shown in FIG. 4 and FIG. 5, as long as gear accuracy can be kept within a range of desired accuracy (for example, the outer circumferential edge of the web 4 can be connected to the inner circumferential surface of the cylindrical section 13 and the connection position can be shifted to a right-hand direction along the rotational center axis CL). Alternatively, the connection position can be shifted closer to the back surface 17 of the disk-shaped section 14 than that in FIG. 4 and FIG. 5. As a result, the line 24 and the second side surface 10 of the web 4 can be positioned such as to be misaligned along the direction in which the rotational center axis CL extends. The line 24 is the bottom land 16 serving as one side surface of the disk-shaped section 14, extended in the inward radial direction. However, regardless of the configuration to be used, the second side surface of the web 4 and the back surface 17 of the disk-shaped section are positioned to be misaligned in the direction along the rotational center axis CL (the direction in which the rotational center axis CL extends). The second side surface 10 of the web 4 is positioned closer to the tooth crests 23 of the teeth 15 than the back surface 17 of the disk-shaped section 14. The overall connection section between the outer circumferential edge of the web 4 and the cylindrical section 13 is positioned between the end surface 19 on one end side of the cylindrical section 13 and the end surface 22 on the other end side (the end surface positioned opposite to the end surface 19 on the one end side, in the direction in which the rotational center axis CL extends). In addition, the overall connection section is misaligned with the end surface 19 on the one end side (the back surface 17 of the disk-shaped section 14) and the end surface 22 on the other end side, in the direction in which the rotational center axis CL extends. In other words, the first side surface 8 of the web 4 is drawn inward towards the end surface 19 on one end side, such that a level difference with the end surface 22 on the other end side of the cylindrical section 13 is formed. The second side surface 10 of the web 4 is drawn inward towards the end surface 22 on the other end side, such that a level difference with the side surface 19 on the one end side of the cylindrical section 13 is formed.

Here, as shown in FIG. 4, a thickness (t3) of the disk-shaped section 14 of the teeth section 5 and the thickness (t1) of the web 4 are the same thickness (t3=t1). A thickness (t2) of the cylindrical section 13 is thinner than the thickness (t3) of the disk-shaped section 14 and the thickness (t1) of the web 4 (t3=t1 and t3>t2).

According to the embodiment, the ratio of thickness of each section is decided such that, for example, when t3=t1=1, t2=0.8·t3. The thicknesses of the web 4, the cylindrical section 13, and the disk-shaped section 14 are decided taking into consideration formation length accuracy, efficiency with which the cavity is filled with molten resin, cooling period after injection-molding, the shrinkage amount after injection-molding, desired rigidity, and the like. When the thickness (t3) of the disk-shaped section 14 is too thick, the tooth flank becomes warped, and precision of the tooth profile deteriorates. When the thickness (t3) of the disk-shaped section 14 is too thin, short shot occurs, and precision of the tooth profile deteriorates. Therefore, the thickness of the disk-shaped section 14 is decided such that deterioration of the precision of the tooth profile caused by formation defects does not occur.

As shown in FIG. 4 and FIG. 5, the injection-molded resin face gear 1 according to the embodiment is formed such that the end surfaces of the first circumferential direction ribs 11a and the end surfaces of the second circumferential direction ribs 12a are positioned on a line extending in the inward radial direction of the tooth crests 23. The injection-molded resin face gear 1 according to the embodiment is also formed such that the end surfaces of the first circumferential direction ribs 11b and the end surfaces of the second circumferential direction ribs 12b are positioned on a line extending in the inward radial direction of the back surface 17 of the disk-shaped section 14 (the end surface 19 on the one end side).

The injection-molded resin face gear 1 according to the embodiment can be formed such that a projection length from the web 4 of at least one of the first circumferential ribs 11a, the first circumferential ribs 11b, the second circumferential ribs 12a, and the second circumferential ribs 12b is changed (for example, the end surface of the first circumferential ribs 11b is positioned further inward than the line extending in the inward radial direction of the back surface 17 of the disk-shaped section 14 [the right-hand side in FIG. 4 and FIG. 5] and the end surface of the second circumferential ribs 12b is formed to project further outward than the line extending in the outward radial direction of the back surface 17 of the disk-shaped section 14 [the left-hand side in FIG. 4 and FIG. 5]), and the thickness of at least one of the first circumferential ribs 11a, the first circumferential ribs 11b, the second circumferential ribs 12a, and the second circumferential ribs 12b differs from the other sections. Therefore, the injection-molded resin face gear 1 can be formed such that the surface rigidity of the web 4 and the overall formation shrinkage are balanced, thereby keeping the collapse of the tooth crests 23 within the range of desired accuracy.

As long as the overall formation shrinkage can be balanced and the collapse of the tooth crests 23 can be kept within the range of desired accuracy, the injection-molded resin face gear 1 according to the embodiment can be formed such that the positions of the back surface 17 of the disk-shaped section 14 and the end surface 19 of the one end side of the cylindrical section 13 are misaligned along the direction in which the rotational center axis CL extends. Alternatively, the positions of the tooth crests 23 and the end surface 22 on the other end side of the cylindrical section 13 can be misaligned along the direction in which the rotational center axis CL extends.

The injection-molded resin face gear 1 according to the embodiment can be formed such that the outer peripheral surface 25 of the disk-shaped section 13 and the outer peripheral surface 26 of the teeth 15 are misaligned along the radial direction, as long as the overall formation shrinkage can be balanced and the collapse of the tooth crests 23 can be kept within the range of desired accuracy.

The injection-molded resin face gear 1 according to the embodiment can be formed such that the connection position between the boss 3 and the web 4 is shifted along the direction in which the rotational center axis CL extends, as long as the overall formation shrinkage can be balanced and the collapse of the tooth crests 23 can be kept within the range of desired accuracy. Alternatively, the shape of the boss 3 can be changed accordingly.

An aspect of the injection-molded resin face gear 1 according to the embodiment is given as an example, in which, when the thickness of the web 4 is t1, the length from the second side surface 10 of the web 4 to the end surface 19 on one end side of the cylindrical section 13, along the direction in which the rotational center axis CL extends, is almost t1. The length from the first side surface 8 of the web 4 to the end surface 22 on the other end of the cylindrical section 13, along the direction in which the rotational center axis CL extends, is almost t1. However, the present invention is not limited thereto. As long as the overall formation shrinkage can be balanced and the collapse of the tooth crests 23 can be kept within the range of desired accuracy, the length from the end surface 19 on one end side of the cylindrical section 13 to the end surface 22 on the other end of the cylindrical section 13, along the direction in which the rotational center axis CL extends, can be changed accordingly based on the module of the teeth 15 and the like. For example, in the injection-molded resin face gear 1, when the thickness of the web 4 is t1, the length from the end surface 19 on one end side of the cylindrical section 13 to the end surface 22 on the other end of the cylindrical section 13, along the direction in which the rotational center axis CL extends, is not limited to 3·t1. The length from the end surface 19 on one end side of the cylindrical section 13 to the end surface 22 on the other end of the cylindrical section 13, along the direction in which the rotational center axis CL extends, can be changed accordingly to 2.6·t1, 2.8·t1, and the like, based on the module of the teeth 15 and the like.

Figure 8:
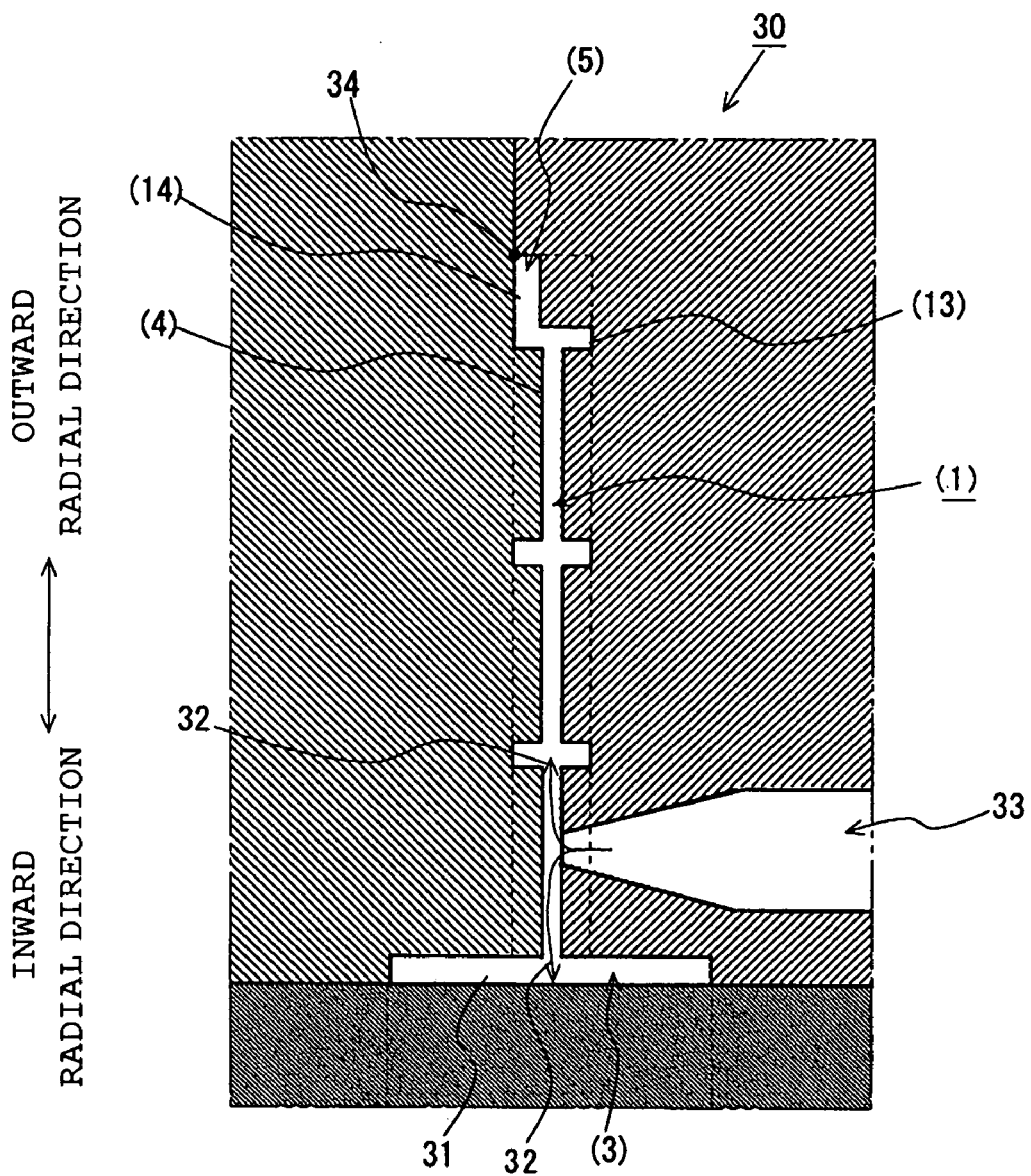
FIG. 8 is a schematic diagram of an injection-molding state of the injection-molded resin face gear according to the embodiment of the present invention (a flow of molten resin within a cavity of an injection-molding mold)

FIG. 8 is a schematic diagram of an injection-molding state of the injection-molded resin face gear 1 according to the embodiment of the present invention (a flow 32 of molten resin within a cavity 31 of an injection-molding mold 30). As shown in FIG. 8, the molten resin discharged into the cavity 31 from a gate 33 is divided into a flow 32 that flows in an inward radial direction towards a section (3) within the cavity 31 forming the boss and a flow 32 that flows in an outward radial direction towards a section (5) within the cavity 31 forming the teeth section. The flow 32 of molten resin flowing through a section (4) within the cavity 31 forming the web in the outward radial direction flows into a section (13) within the cavity 31 forming the cylindrical section of the teeth section. The flow 32 of molten resin flows within the section (5) within the cavity 31 forming the teeth section such as to collect gas within the section (5) within the cavity 31 forming the teeth section in a back surface side outer circumferential end 34 of a section (14) forming the disk-shaped section of the teeth section. As a result, when the injection-molded resin face gear 1 (after injection-molding) is removed from the injection-molding mold 30, the teeth 15 are formed with high accuracy, without formation defects in the teeth 15 caused by gas within the cavity.

As described above, the injection-molded resin face gear 1 according to the embodiment can suppress the collapse of the teeth 15 caused by shrinkage (formation shrinkage) of resin after injection-molding. As a result, the gear is highly accurate and rotation transmission accuracy is enhanced.

As described above, the recess 21 is formed on the back surface 17 of the disk-shaped section 14, caused by a difference in shrinkage (formation shrinkage) of the resin after injection-molding between the section corresponding to the teeth 15 of the disk-shaped section 14 and the section corresponding to the bottom land 16. However, other than the recess 21 caused by the difference in shrinkage of the resin, regular or irregular miniscule recesses (for example, a recess shaped as if a portion of a sphere has been cut out) can also be formed.

A draft (not shown) is attached as required to the inner circumferential surfaces and the like of the first circumferential ribs 11a, the first circumferential ribs 11b, the second circumferential ribs 12a, the second circumferential ribs 12b, and the cylindrical section 13.

VARIATION EXAMPLE 1

The present invention is not limited to the injection-molded resin face gear 1 according to the above-described embodiment. The injection-molded resin face gear 1 can be formed such that the thickness (t3) of the disk-shaped section 14 of the teeth section 5 and the thickness (t2) of the cylindrical section 13 are the same thickness (t3=t2), and the thickness (t1) of the web 4 is thinner than the thickness (t3) of the disk-shaped section 14 (t3=t2 and t1<t3) (see FIG. 4). In the injection-molded resin face gear 1 of the variation example 1, for example, when t3=t2=1, the ratio of thickness of each section is decided such that t1=0.8t3 (see FIG. 4).

In the injection-molded resin face gear 1 of the variation example 1 the collapse of the teeth 15 caused by shrinkage (formation shrinkage) of resin after injection-molding can be suppressed in the same manner as the injection-molded resin face gear 1 according to the above-described embodiment. As a result, the gear is highly accurate and rotation transmission accuracy is enhanced (see FIG. 4 and FIG. 5).

VARIATION EXAMPLE 2

The present invention is not limited to the injection-molded resin face gear 1 according to the above-described embodiment. The injection-molded resin face gear 1 can be formed such that the thickness (t3) of the disk-shaped section 14 of the teeth section 5 and the thickness (t2) of the cylindrical section 13 are the same thickness (t3=t2), and the thickness (t1) of the web 4 is thicker than the thickness (t3) of the disk-shaped section 14 (t3=t2 and t1>t3) (see FIG. 4). In the injection-molded resin face gear 1 of the variation example 2, for example, when t3=t2=1, the ratio of thickness of each section is decided such that t1=1.2t3 (see FIG. 4).

In the injection-molded resin face gear 1 of the variation example 2 the collapse of the teeth 15 caused by shrinkage (formation shrinkage) of resin after injection-molding can be suppressed in the same manner as the injection-molded resin face gear 1 according to the above-described embodiment. As a result, the gear is highly accurate and rotation transmission accuracy is enhanced (see FIG. 4 and FIG. 5).

REFERENCE EXAMPLE 1

Figure 9:
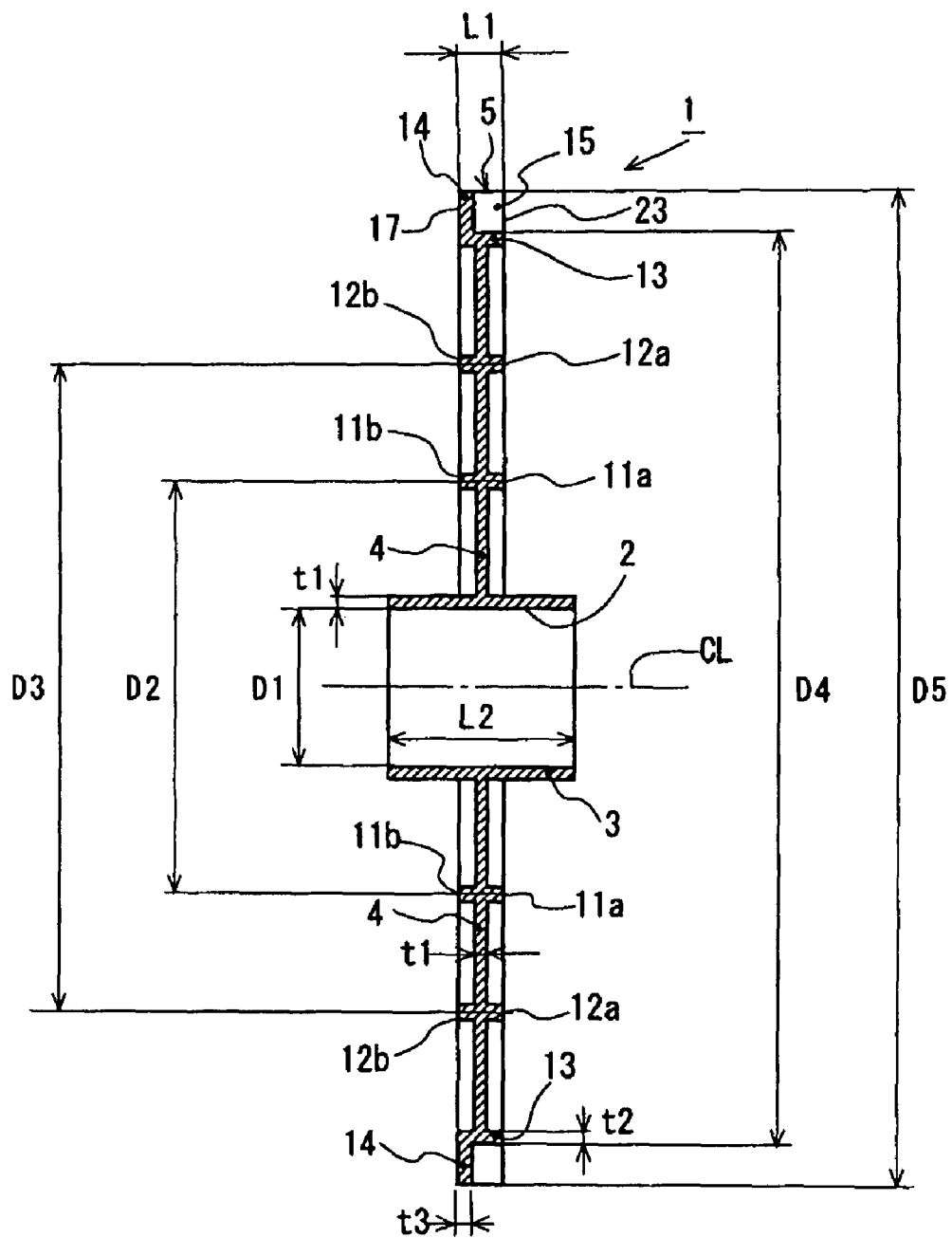
FIG. 9 is a cross-sectional view of an example of dimensions of the injection-molded resin face gear according to the embodiment of the present invention, corresponding to FIG. 4.

FIG. 9 is a diagram explaining a specific dimension example of the injection-molded resin face gear 1 according to the above-described embodiment.

In the injection-molded resin face gear 1 shown in FIG. 9, when a hole diameter of the axis hole 2 is D1, diameters (a diameter at a center position of the thickness of the first circumferential ribs) of the first circumferential ribs 11a and the first circumferential ribs 11b are D2, diameters (a diameter at a center position of the thickness of the second circumferential ribs) of the second circumferential ribs 12a and the second circumferential ribs 12b are D3, an outer diameter length of the cylindrical section 13 is D4, and an outer diameter length of the disk-shaped section 14 is D5, D1=10 mm, D2=27.6 mm, D3=43.6 mm, D4=61.6 mm, and D5=66.0 mm. In addition, in the injection-molded resin face gear 1 shown in FIG. 9, when a width dimension of the teeth section 5 (a length from the back surface 17 of the disk-shaped section 14 to the tooth crest 23 of the tooth 15 in the direction along the rotational center axis CL) is L1 and the length of the boss 3 in the direction along the rotational center axis CL is L2, L1=3 mm and L2=10 mm.

In the injection-molded resin face gear 1 of a size described above, the thickness t3 of the disk-shaped section 14 and the thickness t1 of the web 4 are formed to be 1 mm thick. The thickness t2 of the cylindrical section 13 is formed to be 0.8 mm thick.

The values given in the reference example 1 are examples used to facilitate understanding of the injection-molded resin face gear 1 of the present invention and are not limited thereto.

REFERENCE EXAMPLE 2

Figure 10:
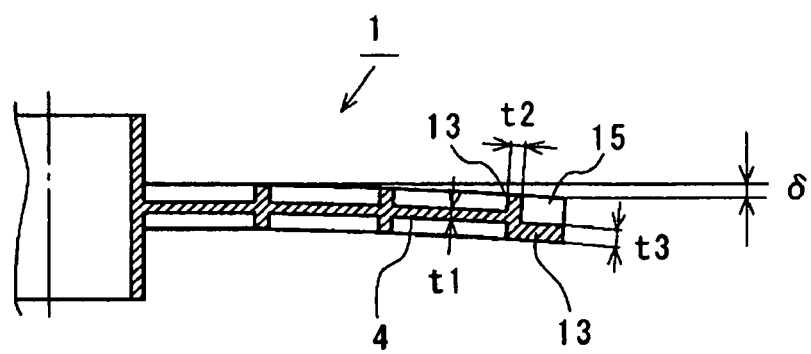
FIG. 10 is a diagram of a collapse of an injection-molded resin face gear in a reference example 2 of the present invention.

Table 1, below, shows a relationship among the thickness t1 of the web 4, the thickness t2 of the cylindrical section 13, the thickness t3 of the disk-shaped section 14, and a maximum collapse amount δ in the outer circumferential edge of the injection-molded resin face gear 1 (a maximum amount of warping caused by shrinkage of resin after injection-molding) (see FIG. 10).

In Table 1, a comparison example is an injection-molded resin face gear 1 in which a relationship t1=t2=t3 is established. Type A is an injection-molded resin face gear 1 in which a relationship t1=t3>t2 is established. Type A corresponds with an injection-molded resin face gear 1 of an invention according to claim 1. Type B is an injection-molded resin face gear 1 in which a relationship t2=t3>t1 is established. Type B corresponds with an injection-molded resin face gear 1 of an invention according to claim 2. Type C is an injection-molded resin face gear 1 in which a relationship t2=t3<t1 is established. Type C corresponds with an injection-molded resin face gear 1 of an invention according to claim 3. Type A has the same dimensions as the injection-molded resin face gear 1 of the reference example 1, described above. Excluding the dimensional relationship among t1, t2, and t3, the comparison example, Type B injection-molded resin face gear 1, and Type C injection-molded resin face gear 1 are each formed such that other dimensions are the same as those of Type A (the above-described reference example 1).

TABLE 1

| | (unit: mm) | | | |
|---|---|---|---|---|
| Type | t1 | t2 | t3 | δ |
| Comparison Example | 1.0 | 1.0 | 1.0 | 0.0993 |
| Type A | 1.0 | 0.8 | 1.0 | 0.0741 |
| Type B | 1.0 | 1.2 | 1.2 | 0.0720 |
| Type C | 1.0 | 0.8 | 0.8 | 0.0589 |

Figure 11:
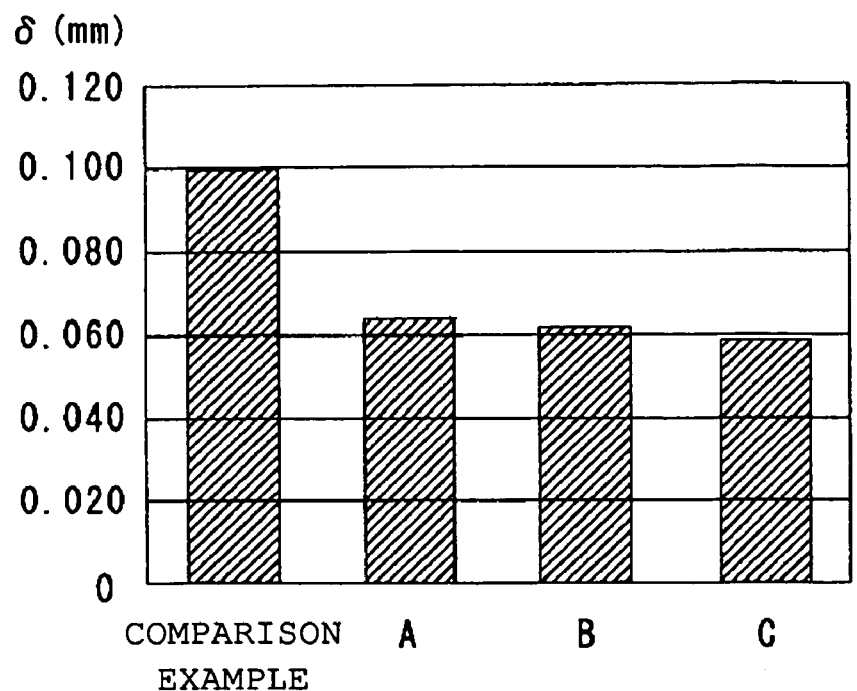
FIG. 11 is a bar graph of maximum collapse amounts δ of a comparison example and Type A to Type C injection-molded resin face gears, in the reference example 2 of the present invention.

FIG. 11 is a bar graph of the maximum collapse amounts δ of the comparison example and Type A to Type C.

As shown in Table 1 and FIG. 11, the maximum collapse amounts δ of Type A to Type C are each less than the maximum collapse amount δ of the comparison example.

Table 2, below, shows a comparison of the maximum collapse amounts δ of the comparison example and Type D to Type F. In Table 2, the comparison example is the same as the comparison example in Table 1. Type D to Type F are injection-molded resin face gears 1 in which a relationship t1=t2<t3 is established. Among these, Type D is an injection-molded resin face gear 1 in which t1=1.0 mm, t2=1.0 mm, and t3=1.1 mm. Other dimensions of Type D are the same as those of Type A. Type E is an injection-molded resin face gear 1 in which t1=1.0 mm, t2=1.0 mm, and t3=1.2 mm. Other dimensions of Type E are the same as those of Type A. Type F is an injection-molded resin face gear 1 in which t1=1.0 mm, t2=1.0 mm, and t3=1.5 mm. Other dimensions of Type F are the same as those of Type A.

TABLE 2

(unit: mm)

| Type | t1 | t2 | t3 | δ |
|---|---|---|---|---|
| Comparison Example | 1.0 | 1.0 | 1.0 | 0.0993 |
| Type D | 1.0 | 1.0 | 1.1 | 0.0968 |
| Type E | 1.0 | 1.0 | 1.2 | 0.0991 |
| Type F | 1.0 | 1.0 | 1.5 | 0.0525 |

Figure 12:
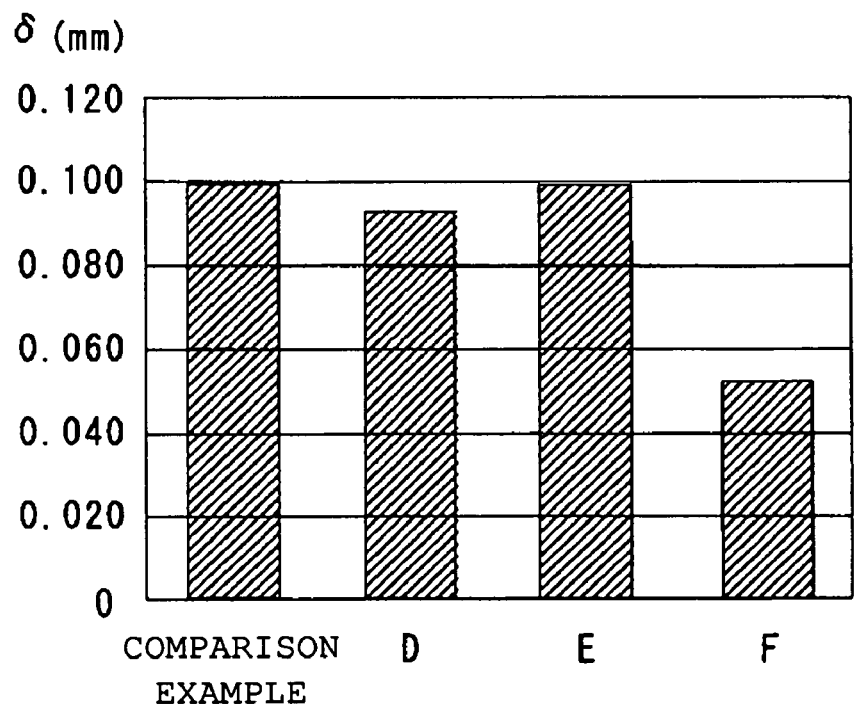
FIG. 12 is a bar graph of maximum collapse amounts δ of the comparison example and Type D to Type F injection-molded resin face gears, in the reference example 2 of the present invention.
Figure 13:
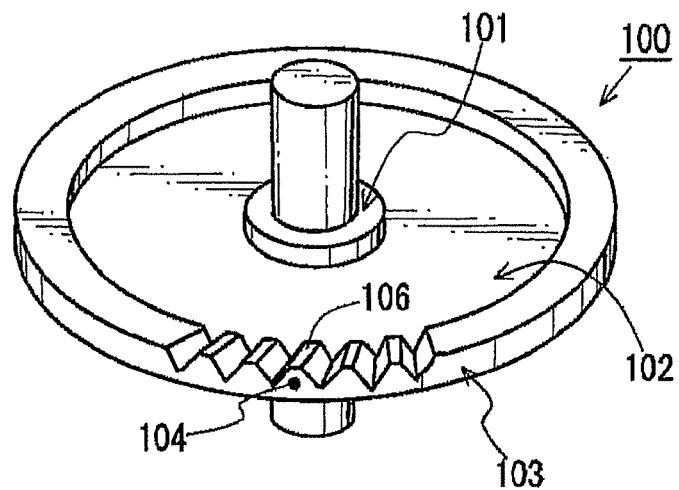
FIG. 13 is a perspective view of a conventional face gear.
Figure 14:
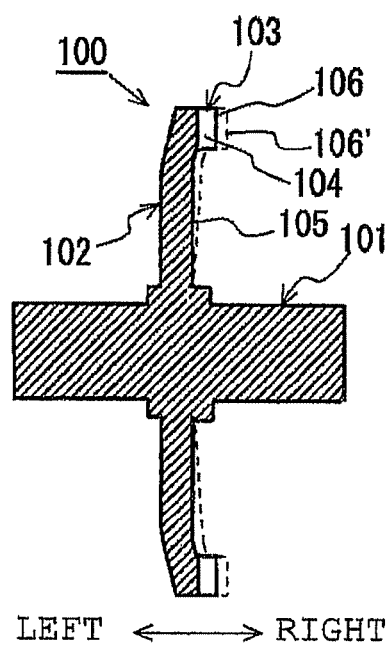
FIG. 14 is a vertical cross-sectional view of the conventional face gear.

FIG. 12 is a bar graph of the maximum collapse amounts δ of the comparison example and Type D to Type F.

As shown in Table 2 and FIG. 12, the maximum collapse amounts δ of Type D and Type E are almost the same as or slightly less than the maximum collapse amount δ of the comparative example. On the other hand, the maximum collapse amount δ of Type F is significantly less than the maximum collapse amount δ of the comparative example (almost half). Therefore, in the injection-molded resin face gear 1, when t1=t2=1.0 mm, the maximum collapse amount δ can be equal to or less than that of the comparison example if at least t3 is 1.0 mm<t3≦1.5 mm.

The values given in the reference example 2 are examples used to facilitate understanding of the injection-molded resin face gear 1 and are not limited thereto.

The comparison example and Type A to Type F in the reference example 2 have a commonality in terms of being an injection-molded resin face gear 1 of which the thickness t1 of the web 4 is 1.0 mm.

INDUSTRIAL APPLICABILITY

The injection-molded resin face gear of the present invention can allow power transmission between two perpendicular axes. Therefore, in addition to being used in power transmission machines transmitting power from a driving side to a driven side, the injection-molded resin face gear can be widely used in rotation transmission machines, such as sensors, requiring highly accurate rotation transmission between two perpendicular axes.

What is claimed is:

1. An injection-molded resin face gear including a boss, a disk-shaped web formed on an outer circumferential side of the boss in an outward radial direction, and a teeth section formed on an outer peripheral edge of the web, wherein:
the teeth section includes a cylindrical section connected to the outer peripheral edge of the web, a disk-shaped section formed on one end side of the cylindrical section in the outward radial direction, and a plurality of teeth formed evenly spaced on an outer circumferential side of the cylindrical section such that one side surface of the disk-shaped section is a bottom land;
the disk-shaped section and the web have the same thicknesses, and the thickness of the cylindrical section is thinner than the thickness of the disk-shaped section;
an overall connection section between the web and the cylindrical section is positioned between an end surface on the one end side of the cylindrical section and an end surface on another end side that is an opposite side to the one end side, and is positioned to be misaligned with another side surface of the disk-shaped section and the end surface on the other end side of the cylindrical section, along a direction in which a rotational center axis extends; and wherein
an other side surface of the disk-shaped section and the end surface on the one end side of the cylindrical section are positioned on a same plane, an outer peripheral surface of the disk-shaped section and an outer peripheral surface of the teeth are positioned on a same peripheral surface, and tooth crests of the teeth and the end surface on the other end side of the cylindrical section are positioned on a same plane.

2. An injection-molded resin face gear including a boss, a disk-shaped web formed on an outer circumferential side of the boss in an outward radial direction, and a teeth section formed on an outer peripheral edge of the web, wherein:
the teeth section includes a cylindrical section connected to the outer peripheral edge of the web, a disk-shaped section formed on one end side of the cylindrical section in the outward radial direction, and a plurality of teeth formed evenly spaced on an outer circumferential side of the cylindrical section such that one side surface of the disk-shaped section is a bottom land;
the disk-shaped section and the cylindrical section have the same thicknesses, and the thickness of the web is thinner than the thickness of the disk-shaped section;
an overall connection section between the web and the cylindrical section is positioned between an end surface on the one end side of the cylindrical section and an end surface on another end side that is an opposite side to the one end side, and is positioned to be misaligned with another side surface of the disk-shaped section and the end surface on the other end side of the cylindrical section, along a direction in which a rotational center axis extends; and wherein
an other side surface of the disk-shaped section and the end surface on the one end side of the cylindrical section are positioned on a same plane, an outer peripheral surface of the disk-shaped section and an outer peripheral surface of the teeth are positioned on a same peripheral surface, and tooth crests of the teeth and the end surface on the other end side of the cylindrical section are positioned on a same plane.

3. An injection-molded resin face gear including a boss, a disk-shaped web formed on an outer circumferential side of the boss in an outward radial direction, and a teeth section formed on an outer peripheral edge of the web, wherein:
the teeth section includes a cylindrical section connected to the outer peripheral edge of the web, a disk-shaped section formed on one end side of the cylindrical section in the outward radial direction, and a plurality of teeth formed evenly spaced on an outer circumferential side of the cylindrical section such that one side surface of the disk-shaped section is a bottom land;

the disk-shaped section and the cylindrical section have the same thicknesses, and the thickness of the web is thicker than the thickness of the disk-shaped section;

an overall connection section between the web and the cylindrical section is positioned between an end surface on the one end side of the cylindrical section and an end surface on another end side that is an opposite side to the one end side, and is positioned to be misaligned with another side surface of the disk-shaped section and the end surface on the other end side of the cylindrical section, along a direction in which a rotational center axis extends; and wherein an other side surface of the disk-shaped section and the end surface on the one end side of the cylindrical section are positioned on a same plane, an outer peripheral surface of the disk-shaped section and an outer peripheral surface of the teeth are positioned on a same peripheral surface, and tooth crests of the teeth and the end surface on the other end side of the cylindrical section are positioned on a same plane.

4. An injection-molded resin face gear including a boss, a disk-shaped web formed on an outer circumferential side of the boss in an outward radial direction, and a teeth section formed on an outer peripheral edge of the web, wherein:

the teeth section includes a cylindrical section connected to the outer peripheral edge of the web, a disk-shaped section formed on one end side of the cylindrical section in the outward radial direction, and a plurality of teeth formed evenly spaced on an outer circumferential side of the cylindrical section such that one side surface of the disk-shaped section is a bottom land;

the web and the cylindrical section have the same thicknesses, and the thickness of the disk-shaped section is thicker than the thickness of the web;

an overall connection section between the web and the cylindrical section is positioned between an end surface on the one end side of the cylindrical section and an end surface on another end side that is an opposite side to the one end side, and is positioned to be misaligned with another side surface of the disk-shaped section and the end surface on the other end side of the cylindrical section, along a direction in which a rotational center axis extends; and wherein an other side surface of the disk-shaped section and the end surface on the one end side of the cylindrical section are positioned on a same plane, an outer peripheral surface of the disk-shaped section and an outer peripheral surface of the teeth are positioned on a same peripheral surface, and tooth crests of the teeth and the end surface on the other end side of the cylindrical section are positioned on a same plane.

* * * * *